No. 633,451. Patented Sept. 19, 1899.
A. H. T. HANSEN.
CHAINLESS BICYCLE.
(Application filed Feb. 23, 1899.)
(No Model.)
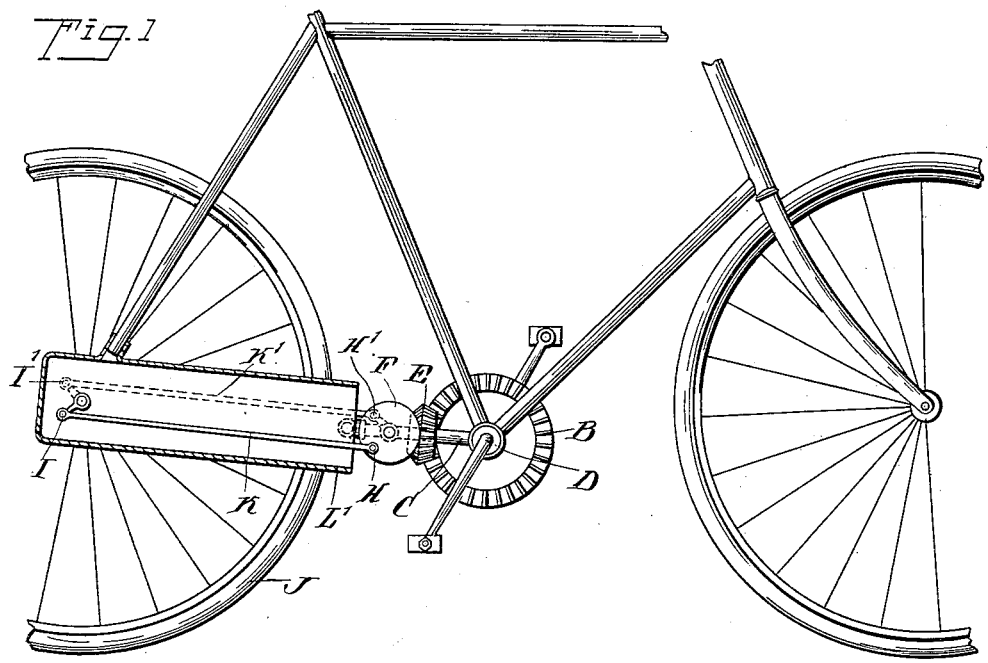
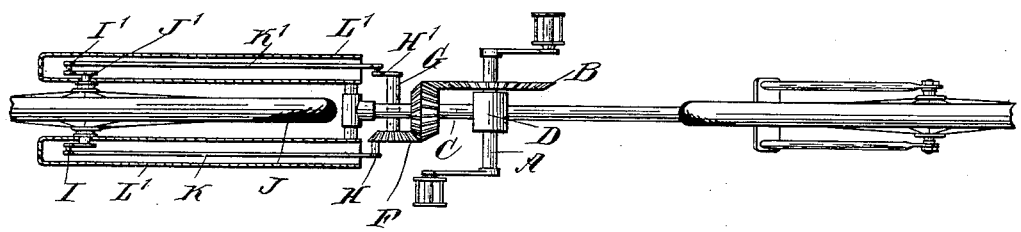
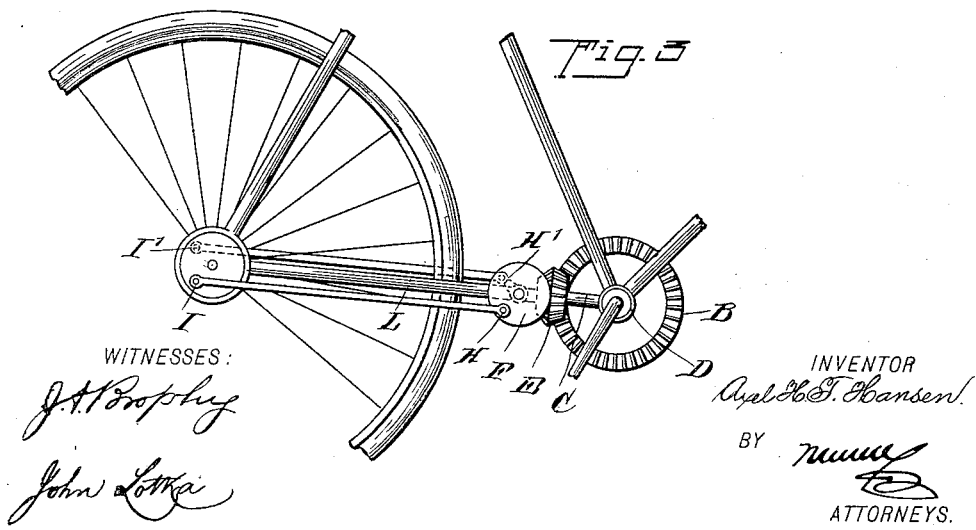
WITNESSES:
INVENTOR
BY
ATTORNEYS.

UNITED STATES PATENT OFFICE.

AXEL HARALD THOMAS HANSEN, OF BUENOS AYRES, ARGENTINA.

CHAINLESS BICYCLE.

SPECIFICATION forming part of Letters Patent No. 633,451, dated September 19, 1899.

Application filed February 23, 1899. Serial No. 706,557. (No model.)

*To all whom it may concern:*

Be it known that I, AXEL HARALD THOMAS HANSEN, of Buenos Ayres, Argentina, have invented new and useful Improvements in Chainless Bicycles, of which the following is a full, clear, and exact description.

My invention relates to chainless bicycles, and has for its object to provide a comparatively simple construction in which one-sided strains will be avoided.

The invention will be fully described hereinafter and the features of novelty pointed out in the appended claims.

Reference is to be had to the accompanying drawings, forming a part of this specification, in which similar characters of reference indicate corresponding parts in all the figures.

Figure 1 is a side elevation of a bicycle provided with my improved driving-gear. Fig. 2 is a partial inverted plan thereof, and Fig. 3 is a partial side elevation showing a simpler form of frame.

The frame of the bicycle may be of the usual construction except as to the details mentioned hereinafter. On the pedal-shaft A is secured a driving-wheel (preferably a bevel-wheel) B, located in the place of the ordinary front sprocket—that is, at one side of the longitudinal central plane of the machine. The rear stay C from the crank-hanger D rearward is single instead of double, as usual, extending in the longitudinal central plane of the bicycle, and on this single stay is mounted to rotate, preferably on ball-bearings, (not shown,) a transmission-wheel, which, as represented, is a wheel E, beveled upon its front surface as well as upon the rear surface. The front surface engages the driving-wheel B, while the rear surface on the opposite side of the longitudinal central plane engages a bevel-pinion F, secured upon a transverse shaft G, journaled in the rear stay C. The pinion has a crank-pin H, and on the opposite side of the wheel the shaft has a crank H', the crank and crank-pin being preferably set at ninety degrees to each other. Similarly-located crank-pins I I' are mounted upon the hub J' of the rear wheel J, and rods K K' connect the two sets of crank-pins H I and H' I'.

The rear horizontal fork L may be of the ordinary shape and simply connect with the rear end of the stay C, as shown in Fig. 3. When it is desired to protect the connecting-rods K K', the members L' of the rear fork are made tubular and open at one end to receive and cover the said connecting-rods, (see Figs. 1 and 2,) it being understood that the distance from the bottom wall of the tubes to the top is sufficient to allow for the required vertical movement of the connecting-rods.

It will be seen that the rear wheel J is driven from both sides, also that owing to the central location of the transmission-wheel E lateral strains are minimized, particularly as the driving-wheel B and the pinion F engage said transmission-wheel on opposite sides of the longitudinal central plane of the machine. The construction is strong and durable, especially when the tubular rear stays L' are employed.

Having thus described my invention, I claim as new and desire to secure by Letters Patent—

1. In a chainless bicycle, the combination with the crank-hanger, a central rear stay extending from the crank-hanger, a rear fork secured to the rear end of the said stay, and the rear wheel mounted in the rear fork and having a crank-pin at each end of its axle, of a pedal-shaft mounted in the crank-hanger, a gear-wheel on the pedal-shaft at one side of the crank-hanger, a transverse shaft mounted upon the rear end of the central stay and having a crank-pin at one end, a pinion on the other end of the transverse shaft and on the side of the machine opposite that on which the gear-wheel is mounted, said pinion being provided with a crank-pin, a double-faced gear-wheel mounted on the central stay between the hanger and transverse shaft and meshing with the said gear-wheel and pinion, and rods connecting the crank-pins of the rear wheel with the crank-pins of the transverse shaft and pinion, substantially as described.

2. A bicycle or like vehicle, provided with a crank-hanger, a central rear stay extending therefrom and a rear fork connected with said rear stay and having two tubular members open at their front ends, in combination with a pedal-shaft or drive-shaft journaled in said crank-hanger and carrying a driving-wheel at one side, a shaft extending transversely at the rear portion of the said rear stay and carrying a pinion on the opposite side of the machine to the said driving-wheel, a transmission-wheel mounted to rotate upon the central rear stay between said driving-wheel and said pinion and engaging both of them, two crank-pins on said transverse shaft, and rods connecting said pins with like pins on the hub of the rear wheel or drive-wheel of the machine, said rods extending in the tubular fork members.

AXEL HARALD THOMAS HANSEN.

Witnesses:
RICHARD AIGNER,
RENÉ LARNELLE.